United States Patent
Johannsson

(12) 
(10) Patent No.: US 6,235,327 B1
(45) Date of Patent: May 22, 2001

(54) USE OF PLATE FOR TRANSPORTING OF FISH FILLET THROUGH PROCESSING

(76) Inventor: Björn Johannsson, Brekkuseli 23, IS-109 Reykjavik (IS)

( * ) Notice: Subject to any disclaimer, the term of this patent is extended or adjusted under 35 U.S.C. 154(b) by 0 days.

(21) Appl. No.: 09/423,514

(22) PCT Filed: Apr. 24, 1998

(86) PCT No.: PCT/IS98/00003

§ 371 Date: Nov. 10, 1999

§ 102(e) Date: Nov. 10, 1999

(87) PCT Pub. No.: WO98/51161

PCT Pub. Date: Nov. 19, 1998

(30) Foreign Application Priority Data

May 16, 1997 (IS) .......................................... 4482

(51) Int. Cl.⁷ ...................................................... A23L 1/00
(52) U.S. Cl. .......................... 426/231; 426/479; 426/524; 426/665
(58) Field of Search ..................... 426/231, 479, 426/524, 643, 129, 393, 665; 452/161

(56) References Cited

U.S. PATENT DOCUMENTS 2,827,383 * 3/1958 Gorton, Jr. .......................... 426/479

* cited by examiner

Primary Examiner—George C. Yeung
(74) Attorney, Agent, or Firm—Browdy & Neimark

(57) ABSTRACT

This invention is a new method in fish processing for best possible protection of fish fillets and/or fillet parts through the whole processing, from filleting (deskinning) to packing or freezing. The character of this invention is that every single fillet placed on a plate approx. 200×600 mm made of stainless steel aluminium or other suitable material like plastic etc. The plates are conveyed between operations by conveyors of different types. Only at the trimming-table and the inspection-table, fillets or fillet parts are moved from the plate. After trimming or inspection the fillets or fillet parts are moved back to the same plate again. Every single plate has its own I.D. (chips or bar code) for identifying where it is situated in the process for internal control.

4 Claims, 1 Drawing Sheet

USE OF PLATE FOR TRANSPORTING OF FISH FILLET THROUGH PROCESSING

DESCRIPTION

Figure 1:
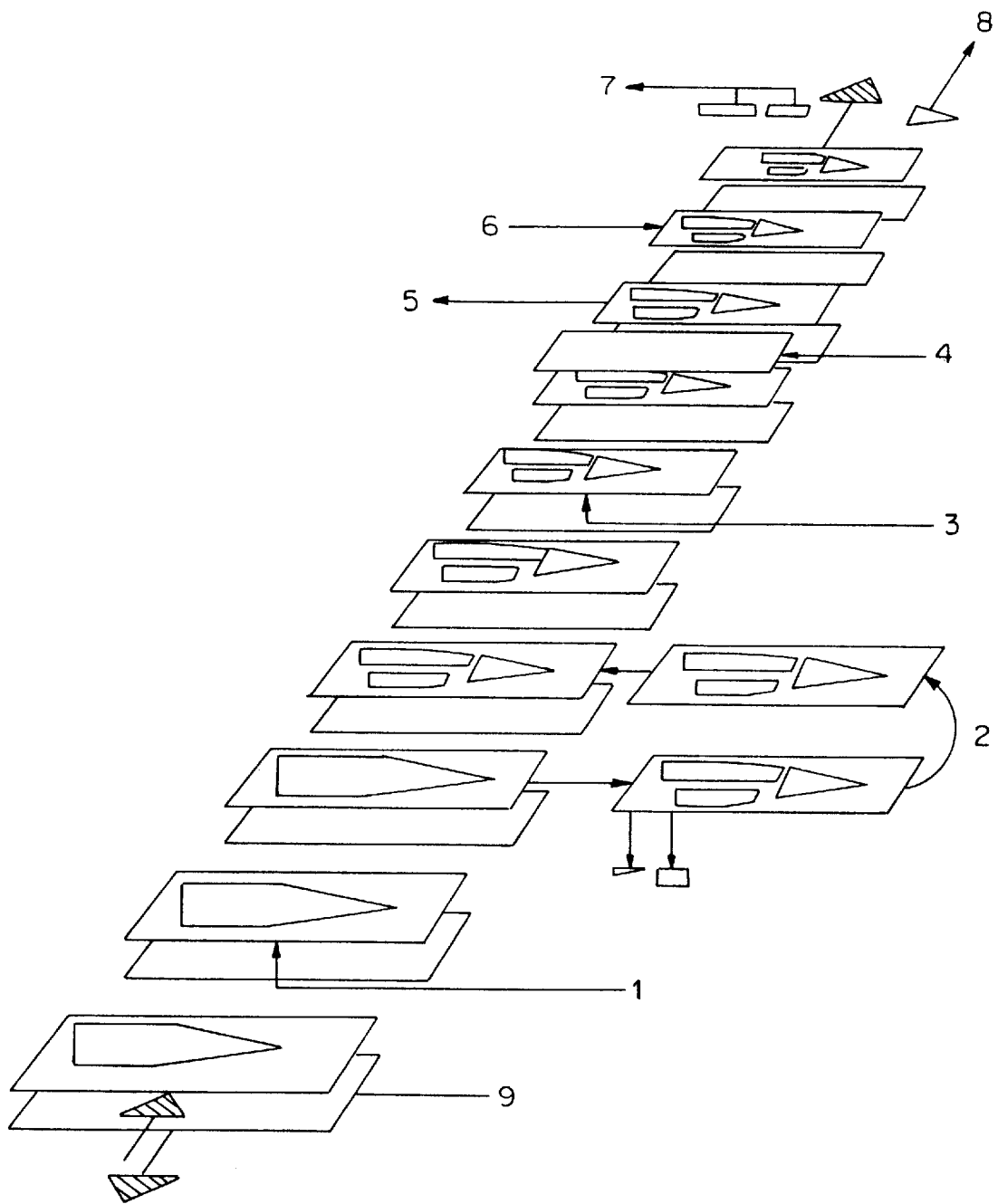

The invention relates to a new method in fish processing for best possible protection of fish fillets through the whole processing, from filleting (deskinning) to packing or/and freezing.

Tray processing lines have been widely used. The character of tray processing lines are buffer of fillets ca. 15–20 kg pr. tray and the trays are handled or conveyed from one workplace to another until processing is finished. Disadvantage relates to the quantity pr. tray 15–20 kg (approx. 30–60 fillets) causing bad handling of fillets and a long waiting time between operations, leading to drip loss and poor quality.

Flow lines have been the most used method recently and with its increased speed of fillets throughout the process, the processing time has decreased and also the drip loss. The disadvantage of the flow lines is bad handling of individual fillets or fillet parts by dropping from one conveyor belt to another and series of pushes by air operated cylinders of fillets from conveyor belt to buffers. This handling cause poor utilisation of the fillets and fillet portions for the most valuable products.

The present invention is a new method for gentle handling of fillet or fillet portions through the entire process by placing fillets on a plate. The plates are conveyed between operations. Only at the trimming-table and and inspection-table fillets or fillet parts are moved from the plate for trimming or quality control, Every plate has its own identifier I.D (chips or bar code) for identifying where it is situated in the process for internal control. FIG. 1 shows the plate-processing line in a schematic way.

The invention will be described in detail with reference to the figure. The character of the invention is that every single fillets are placed on a plate approx. 200×600 mm (suitable for size of fillets) made of stainless steel, aluminium or other suitable material like plastic, etc. The plates are conveyed between operations by conveyors of different types, which are not part of this invention. The main character of this invention is that single fillets from filleting or de-skinner are placed on single plate, and then moved by this plate from operation to operation throughout the whole process. Every plate has installed its own ID mark (chip or bar code) to be identified throughout the process. Only at the trimming-table (2), it is necessary to remove the fillets from the plate on to the trimming-table for operation . Also at control table (5), fillets can be moved from the plate for quality control. After operation (trimming, portioning etc.) or inspection (quality control etc.), fillet or fillet parts are moved back to the same plate again. For total quality control, an x-ray equipment can be installed in the processing line (4). For control of individual performance on the trimming table (2), weighing of every fillet in to the trimming line are performed at weighing station (1) and after trimming at weighing station (3). The plate can be used for fast freezing of the surface of fillet or fillet parts (6). After fast freezing the plate are turned over and fillet or fillet parts dropped off the plate, optionally heated at this stage, and then moved to portioning (7) or to IQF (Individual Quick Freezing) and packing (8). Empty plate returns back for cleaning (9) and then ready for use again.

What is claimed is:

1. A processing method for protecting fish fillets or parts thereof against damage during transportation from a filleting or de-skinning station to a packing or freezing station, comprising placing each fillet or parts thereof on a separate plate and transporting said separate plate with said fillet or parts thereof on said plate from one operation station to a next operation station, said fillet or parts thereof remaining on said separate plate during substantially said entire transporting from filleting or de-skinning to packing or freezing.

2. The method of claim 1, further comprising identifying each separate plate throughout said method, by its own identifier.

3. The method of claim 2, further comprising heating said separate plate immediately before said fillet or parts thereof is dropped off therefrom prior to passage of said fillet or parts thereof to portioning or IQF freezing.

4. The method of claim 1, further comprising heating said separate plate immediately before said fillet or parts thereof is dropped off therefrom prior to passage of said fillet or parts thereof to portioning or IQF freezing.

* * * * *